Oct. 2, 1962 W. H. FLARITY 3,056,921
VARIABLE FREQUENCY PASSIVE PHASE SHIFTER
Filed Feb. 17, 1959 2 Sheets-Sheet 1

INVENTOR.
WARREN H. FLARITY
BY
Knox & Knox

Oct. 2, 1962 W. H. FLARITY 3,056,921

VARIABLE FREQUENCY PASSIVE PHASE SHIFTER

Filed Feb. 17, 1959 2 Sheets-Sheet 2

INVENTOR.
WARREN H. FLARITY
BY
Knox & Knox

United States Patent Office 3,056,921

Patented Oct. 2, 1962

3,056,921 VARIABLE FREQUENCY PASSIVE PHASE SHIFTER

Warren H. Flarity, San Diego, Calif., assignor to Ryan Aeronautical Co., San Diego, Calif.

Filed Feb. 17, 1959, Ser. No. 793,811
3 Claims. (Cl. 324—57)

The present invention relates generally to phase shifting circuits and more particularly to a variable frequency passive phase shifter.

The primary object of this invention is to provide a phase shifter which is operable with considerable accuracy over a range of frequencies, the specific frequencies being dependent on the choice of components in the circuit.

Another object of this invention is to provide a phase shifter which is of passive type and requires no power supply or other current for its operation, all power being provided by an input signal at known frequency.

Another object of this invention is to provide a phase shifter which utilizes the signal input to drive the equipment being tested for phase shift, and also has an output for comparison of phases.

Another object of this invention is to provide a phase shifter which is insensitive to non-linearities and noise inherent in the equipment being tested.

A further object of this invention is to provide a phase shifter in which the phase shifting circuit has a minimum of voltage variation over the full 360 degrees of rotation and through the full range of the instrument.

Still another object of this invention is to provide a phase shifter having means for equalizing voltages at all points for maximum accuracy.

Finally, it is an object to provide a phase shifter which is simple and convenient to operate and which will give generally efficient and reliable results with many types of equipment.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

Similar characters of reference indicate similar or identical elements and portions throughout the specification and throughout the views of the drawings.

Figures 1, 2:
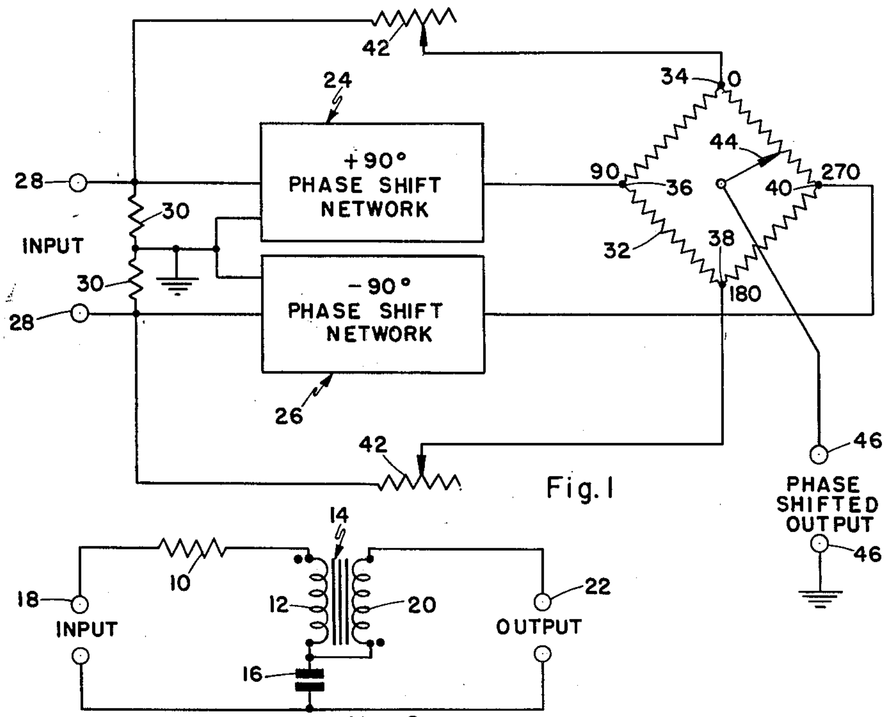
FIGURE 1 is a simplified wiring diagram showing the basic arrangement of the phase shifter.
FIGURE 2 is a schematic wiring diagram of the specific phase shifting network used.

The accurate performance of the instrument over a wide frequency range is made possible by the simple phase shift circuit illustrated in FIGURE 2. In this circuit, a resistor 10, one winding 12 of an inductance 14, and a capacitor 16 are connected in series in that order across an A.C. input 18, to form a series resonance circuit. When A.C. voltage is applied across a reactance, the resultant current is considered as 90 degrees out of phase, the current lagging across an inductance and leading across a capacitor. Since the resonant frequency in the circuit is the frequency at which time inductive reactance is equal to the capacitive reactance, the values of the inductance 14 and capacitor 16 are selected so that their reactances are equal at a predetermined frequency at the center of the range for which the instrument is designed. The value of resistor 10 is chosen so that the current through the reactances is substantially constant over the selected bandwidth. With this arrangement, the current will lead at frequencies below resonance and lag at frequencies above resonance. The inductance 14 has a second winding 20 which transforms the phase voltage in winding 12 by 180 degrees. One end of winding 20 is connected to the junction of winding 12 and capacitor 16 so that the inductance developed voltage in the coil 20 is in phase with the voltage across the capacitor but 90 degrees out of phase with the voltage at the input 18. The output 22 is connected across the winding 20 and capacitor 16 and the resultant output voltage holds a constant 90 degree phase shift over a considerable frequency range with a minimum amplitude variation.

The circuit in FIGURE 1 illustrates how the phase shift circuit may be incorporated into a functional instrument. Two phase shift networks 24 and 26 are used, each incorporating the circuit shown in FIGURE 2, and are arranged so that one produces a plus 90 degree phase shift and the other a minus 90 degree phase shift, as will now be explained. The input terminals 28 are each connected to one of the networks 24 and 26, said networks also being coupled to a common ground. The input terminals 28 are further connected to ground through balancing resistors 30, to establish a common or ground point across the input. The circuit includes a 360 degree rotatable potentiometer 32 having four equally spaced taps at 0, 90, 180 and 270 degrees, the taps being numbered 34, 36, 38 and 40, respectively. The output of network 24 is connected to the 90 degree tap 36, while the output of network 26 is connected to the 270 degree tap 40. The taps 34 and 38 are connected to the input terminals 28 through variable equalizing resistors 42, which are necessary to equalize the voltage at all four taps on the potentiometer, since the output voltage of the phase shift networks varies slightly with changes in frequency. The potentiometer 32 has a wiper 44 which can be set at any position on or between the taps, said wiper being connected across the output terminals 46 to ground.

The input signal is thus broken up into four equal parts, each 90 degrees apart in phase relation, the voltages being equalized at the potentiometer 32. By rotating the wiper 44 any particular phase shift may be obtained at the output, the voltages at the various taps adding vectorially to provide a virtually constant voltage output.

Figure 4:
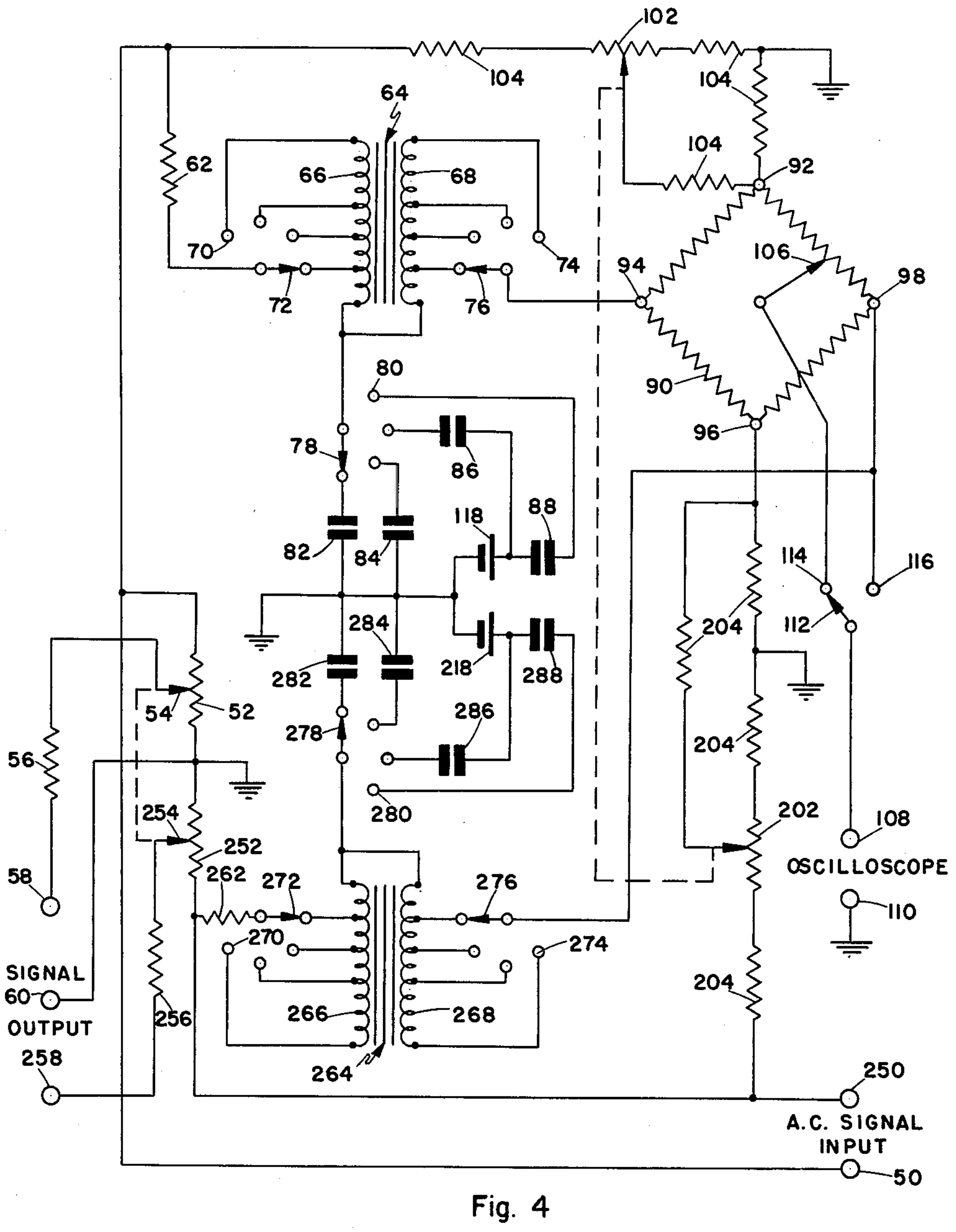
FIGURE 4 is a schematic wiring diagram showing a complete circuit for the phase shifter.

While it should be understood that the circuit may be arranged in many different ways with various combinations of components, one particular tested circuit is illustrated schematically in FIGURE 4. An A.C. signal of desired frequency is applied to the input terminals 50 and 250 which are connected through balancing resistors 52 and 252 to a common ground. The resistors 52 and 252 are variable and ganged together for proportional operation, their sliders 54 and 254 being connected through isolating resistors 56 and 256 to signal output terminals 58 and 258, the common ground connection providing a center output terminal 60. The input terminal 50 is further connected to a series resonance circuit including a resistor 62 and an inductance 64 having an input winding 66 and an output winding 68. One end of the input winding 66 has several taps, four being shown as an example, and these are connected to a multiple contact range switch 70, the movable arm 72 of which is connected to the resistor 62. The output winding 68 is similarly tapped at one end by a range switch 74 having a movable arm 76. The other ends of the windings 66 and 68 are coupled together and are connected to the arm 78 of a further range switch 80 which selects from a bank of four different capacitors 82, 84, 86 and 88, all of which are connected to a common ground. With the range switches positioned as in FIGURE 4, the series resonance circuit comparable to that shown in FIGURE 2 starts at the input terminal 50, continues through resistor 62, inductance input winding 66 and capacitor 82 and so to ground. It will be evident that by adjusting the range switches various inductance and capacitor values can be selected according to the required frequency range.

The circuit includes a 360 degree rotatable potentiometer 90 having four taps 92, 94, 96 and 98 spaced at 0, 90, 180 and 270 degrees respectively. The input terminal 50 is further connected to the tap 92 through a variable equalizing resistor 102, and suitable voltage divider resistors 104 may be included to adjust the voltage to the required value. Other than the equalizing resistor 102, the arrangement of resistors may vary considerably.

The input terminal 250 is further connected to a series resonance circuit identical to that described above, the components being numbered to correspond with those described but having the prefix 2 for identification purposes. The input terminal 250 is also connected to the 180 degree tap 96 through an equalizer resistor 202 and suitable voltage divider resistors 204, the equalizer resistors 102 and 202 being ganged for simultaneous adjustment to equalize voltages at the potentiometer taps.

The arm 76 of range switch 74 is connected directly to the 90 degree tap 94 and the arm 276 of range switch 274 is similarly connected to the 270 degree tap 98. The taps 92 and 96 thus receive two voltages 180 degrees out of phase with each other directly from the A.C. input, while the taps 94 and 98 receive two voltages, also 180 degrees out of phase with each other, from the phase shifting network, the latter voltages being 90 degrees out of phase with those from the A.C. input. For convenience, all the range switches 70, 74, 80, 270, 274 and 280 may be ganged together to a single control, since the component values must be matched at all times to maintain tuning of the resonance circuits in each range of frequencies.

The potentiometer 90 has a rotatable wiper 106 which is connected to one oscilloscope output terminal 108, the other oscilloscope output terminal 110 being grounded. Between the wiper 106 and terminal 108 is a microswitch 112 having two poles 114 and 116. The microswitch 112 is normally closed to the pole 114, connecting the wiper 106 directly to the terminal 108, but can be moved to the other pole 116 which is connected to the 270 degree tap 98. Thus the oscilloscope terminals, while normally fed by the phase shifted voltage from the wiper 106, can be selectively coupled to a 90 degree out-of-phase voltage. The microswitch 112 is preferably incorporated in the control for the wiper 106 to actuate at a predetermined position of the wiper, preferably at the 355 degree position. By turning the wiper control to this position, the output to the oscilloscope can be changed from an in phase voltage to a voltage 90 degrees out of phase, the display being used to equalize voltages at the four potentiometer taps. In this particular circuit, the capacitors 86, 88, 286 and 288 are of polarized type and are biased by suitable batteries 118 and 218. These batteries are included merely as an example and do not provide power for the phase shifter which is passive in operation. For other frequency ranges and different capacitors, batteries may not be necessary.

Figure 3:
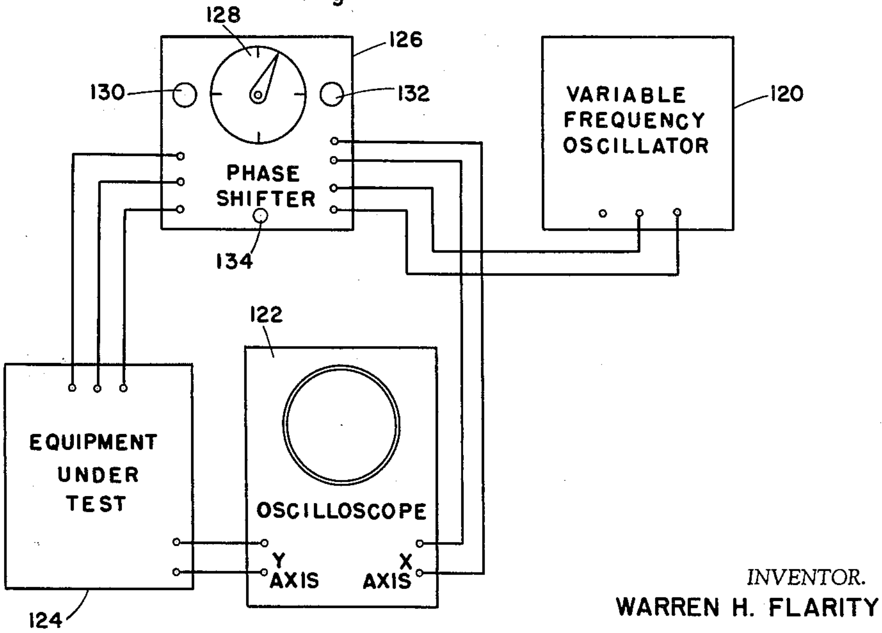
FIGURE 3 is a block diagram of the instrument connected for testing a piece of equipment.

The phase shifter may be used as illustrated in FIGURE 3, in which a variable frequency oscillator 120 is connected to the input terminals 50 and 250 to provide an A.C. signal of the desired frequency, the terminals 108 and 110 being connected to the X axis inputs of an oscilloscope 122. The output terminals 58, 60 and 258 are connected to the equipment under test, indicated at 124, the output of the equipment being fed to the Y axis input of oscilloscope 122. On the phase shifter, indicated at 126, the phase shift control 128, graduated in degrees, is coupled directly to the potentiometer wiper 106, the knob 130 actuates the variable resistors 52 and 252, while the range knob 132 operates the ganged range switches as previously described. The equipment 124 may be a servo motor or the like, the phase shifter being ideally suited for testing servo motors, since the circuit is unaffected by back-lash, non-linearities and noise usually associated with such devices.

The testing procedure is started by adjusting the oscillator 120 to the desired frequency and setting the range knob 132 to the proper frequency range to include that frequency. The phase shift control 128 is turned to the 355 degree position, which operates the microswitch 112 and supplies a 90 degree out-of-phase voltage to the oscilloscope X axis, the display being adjusted to any convenient amplitude. The phase shift control 128 is then turned to zero which supplies an in phase voltage to the oscilloscope X axis, the amplitude being adjusted by means of the variable equalizer resistors 102 and 202 to match the amplitude of the out-of-phase voltage, so that all the potentiometer quadrant voltages are equal. The resistors 102 and 202 may be operated by a convenient knob 134. The Y axis voltage from the equipment 124 may be of any convenient amplitude without affecting the adjustment of the X axis presentation. Thus the oscilloscope display includes direct representation of the equipment output voltage and a variable phase voltage, the amplitudes being independent.

The phase control 128 is now turned until the oscilloscope display becomes a straight line, the phase shift of the equipment 124 being indicated directly in degrees.

The elimination of a power supply greatly simplifies the phase shifter, the passive circuit being especially efficient when used as described above. The oscilloscope 122 normally has ample gain to utilize the signal from the oscillator 120 and the oscilloscope display can be read and controlled accurately even at low amplitudes. Various circuits may be constructed around the basic phase shift circuit shown in FIGURE 2, the arrangement being dependent on the particular use and frequency range required of the instrument.

The operation of this invention will be clearly comprehended from a consideration of the foregoing description of the mechanical details thereof, taken in connection with the drawings and the above recited objects. It will be obvious that all said objects are amply achieved by this invention.

It is understood that minor variation from the form of the invention disclosed herein may be made without departure from the spirit and scope of the invention, and that the specification and drawings are to be considered as merely illustrative rather than limiting.

I claim:

1. In a passive phase shifter: a variable frequency A.C. input; a pair of balancing resistors connected across said A.C. input; the junction of said resistors being connected to a common ground; a pair of independent phase shift networks each coupled to one side of said A.C. input and each comprising an inductance having an input winding and an output winding; a resistor connected between said A.C. input and one end of said input windings; a capacitor connected between the other end of said input windings and said common ground; said resistor, said input winding and said capacitor constituting a series resonance circuit; a first A.C. output connected to one end of said output windings; the other end of said output windings being connected to the junction of said capacitor with said input winding; whereby the voltage at said A.C. output is 90 degrees out of phase with the voltage at said A.C. input; one of said networks being arranged to provide a plus 90 degree phase shift, and the other network being arranged to provide a minus 90 degree phase shift; a continuous potentiometer having four equally spaced taps corresponding to 0, 90, 180 and 270 degrees of phase rotation; said A.C. input being connected to said 0 and 180 degree taps, and said A.C. output being connected to said 90 and 270 degree taps; a variable equalizing resistor means connected between each of said 0 and 180 degree taps and said A.C. input for controlling the amplitude variations that occur when the frequency of said A.C. input is changed; said potentiometer having a rotatable wiper, whereby a phase shifted A.C. output is available at said wiper.

2. A phase shifter according to claim 1 and wherein said capacitors and said inductances are variable; and control means coupled to said capacitors and inductances collectively, whereby the reactances thereof may be varied proportionally.

3. The combination of claim 1 including: an oscilloscope; a connection between the *x* deflection system of said oscilloscope and said wiper of said potentiometer, whereby an A.C. output of continuously adjustable phase may be applied to the *x* deflection system; a second, balanced, three-wire A.C. output from said phase shifter, said output comprising a connection to said common ground and connections to said A.C. input; equipment to be tested, said equipment requiring a balanced, three-wire input; means for connecting the wires from said second A.C. output to said equipment to be tested; a connection between the output of said equipment to be tested and the *y* deflection system of said oscilloscope; and means, comprising said rotatable wiper of said phase shifter, for varying the phase of the signal applied to the *x* deflection system of said oscilloscope until the phase of said first A.C. output coacts with the phase of said output from the equipment under test to produce a straight-line display on said oscilloscope.

References Cited in the file of this patent

UNITED STATES PATENTS

| | | |
|---|---|---|
| 2,229,450 | Garman | Jan. 21, 1941 |
| 2,483,403 | De Rosa | Oct. 4, 1949 |
| 2,668,238 | Frink | Feb. 2, 1954 |
| 2,986,696 | Seay | May 30, 1961 |

FOREIGN PATENTS

| | | |
|---|---|---|
| 451,786 | Great Britain | Aug. 12, 1936 |